US012582908B2

(12) United States Patent
Chayanam et al.

(10) Patent No.: US 12,582,908 B2
(45) Date of Patent: Mar. 24, 2026

(54) SYSTEM AND METHOD FOR GENERATING NOTIFICATIONS FOR AN AVATAR TO CONDUCT INTERACTIONS WITHIN A METAVERSE

(71) Applicant: Bank of America Corporation, Charlotte, NC (US)

(72) Inventors: Pavan Kumar Chayanam, Alamo, CA (US); Indradeep Dantuluri, Harrisburg, NC (US); Prashanth Kolar, Dublin, CA (US); Darshan Kokkanaghatta Nanjegowda, Charlotte, NC (US); Arunachalam Packirisamy, Pleasant Hill, CA (US); Navdeep Mahajan, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 538 days.

(21) Appl. No.: 18/054,419

(22) Filed: Nov. 10, 2022

(65) Prior Publication Data

US 2024/0157240 A1 May 16, 2024

(51) Int. Cl.
*A63F 13/537* (2014.01)
*A63F 13/55* (2014.01)

(52) U.S. Cl.
CPC ............ *A63F 13/537* (2014.09); *A63F 13/55* (2014.09)

(58) Field of Classification Search
CPC ......... A63F 13/537; A63F 13/55; A63F 13/79
See application file for complete search history.

(56) References Cited

U.S. PATENT DOCUMENTS

| | | | |
|---|---|---|---|
| 7,917,371 B2 | 3/2011 | Jung et al. | |
| 7,970,837 B2 | 6/2011 | Lyle et al. | |
| 8,838,169 B2 | 9/2014 | Vendrow et al. | |
| 9,385,986 B2 | 7/2016 | Tseng et al. | |
| 9,865,089 B2 | 1/2018 | Burns et al. | |
| 10,242,032 B2 | 3/2019 | Sundaresan et al. | |
| 10,263,967 B2 | 4/2019 | Josephson et al. | |
| 10,326,667 B2 | 6/2019 | Jones et al. | |

(Continued)

OTHER PUBLICATIONS

Subramanian, N., Chaudhuri, A., Kayikci, Y. (2020). Basics of Blockchain. In: Blockchain and Supply Chain Logistics. Palgrave Pivot, Cham. https://doi.org/10.1007/978-3-030-47531-4_2 (Year: 2020).*

*Primary Examiner* — Peter J Iannuzzi

(57) ABSTRACT

A system for generating notifications to greet and facilitate an avatar to conduct interactions comprises a processor associated with a server. The processor identifies the avatar associated with a user device in a virtual environment and receives a metaverse identifier of the avatar. The processor queries a database to determine whether the metaverse identifier is linked to a user identifier of a user profile. The processor retrieves a user name associated with the user identifier from the database if the metaverse identifier is linked to the user identifier. The processor presents a greeting notification with the user name to a user to grant access to the virtual environment for the avatar. The processor queries the database to obtain interaction data to determine a pending task associated with the user identifier. The processor presents an interaction notification corresponding to a pending task associated with the user identifier to the user device.

20 Claims, 3 Drawing Sheets

(56) References Cited

U.S. PATENT DOCUMENTS

| | | |
|---|---|---|
| 10,506,160 B2 | 12/2019 | Lemberger |
| 10,609,334 B2 | 3/2020 | Li |
| 10,817,162 B2 | 10/2020 | Platzer et al. |
| 10,915,898 B2 | 2/2021 | Musser et al. |
| 10,924,489 B2 | 2/2021 | Xu et al. |
| 11,139,955 B1 | 10/2021 | So et al. |
| 11,196,551 B2 | 12/2021 | Weldemariam et al. |
| 2011/0014985 A1 | 1/2011 | Park et al. |
| 2012/0011450 A1 * | 1/2012 | To ......................... G06Q 30/02 |
| | | 715/752 |
| 2017/0232335 A1 * | 8/2017 | Williams ............... A63F 13/79 |
| | | 463/31 |
| 2021/0058397 A1 | 2/2021 | Shuster et al. |
| 2023/0291740 A1 * | 9/2023 | Ashby .................. H04L 63/083 |

* cited by examiner

SYSTEM AND METHOD FOR GENERATING NOTIFICATIONS FOR AN AVATAR TO CONDUCT INTERACTIONS WITHIN A METAVERSE

TECHNICAL FIELD

The present disclosure relates generally to network communications and information security, and more specifically to a system and method for generating notifications to greet and facilitate an avatar to conduct interactions within a metaverse.

BACKGROUND

Interactions may be performed between a user device and an entity in a real-world environment and a virtual environment. A user may operate a user device as an avatar to access the virtual environment for application services with the entity. Current technology does not provide a reliable and effective solution to greet and facilitate the avatar to conduct interactions in the virtual environment securely and effectively to ensure that the interactions are compatible with user identity and interaction history in the real-world environment.

SUMMARY

Conventional technology is not configured to greet and facilitate an avatar to conduct interactions in a virtual environment (e.g., such as a metaverse). The system described in the present disclosure is particularly integrated into a practical application to generate notifications to greet and facilitate an avatar to conduct interactions in the virtual environment based on user profile information and historical user interactions associated with an entity in the real-world environment.

The disclosed system is configured to greet and facilitate an avatar associated with a user and a user device (e.g., augmented reality (AR)/virtual reality (VR) headset) to conduct interactions in a virtual environment. The disclosed system is configured to identify or establish a link between a metaverse identifier of the avatar in the virtual environment and a user identifier in a real-world environment. The disclosed system is configured to query an interaction database to determine whether the metaverse identifier is linked to a user identifier of a user profile registered with an entity in the real-world environment. If the metaverse identifier is linked to the user identifier, the system may obtain a user name used in the real-world environment and greet the avatar with the user name and grant access to the virtual environment. If the metaverse identifier is not linked to the user identifier, the disclosed system may greet the avatar with the metaverse identifier and communicate with the avatar to obtain the user identifier and authentication data of the user profile. The disclosed system may further establish a link between the metaverse identifier and the user identifier in the interaction database. In one embodiment, the disclosed system may query the interaction database to obtain user historical interactions and generate an interaction notification with a pending task or some interaction options to facilitate the avatar to conduct corresponding interactions in the virtual environment.

In one embodiment, the system for generating notifications to greet and facilitate an avatar in a virtual environment comprises a processor and a memory. The memory is operable to store a user profile registered with an entity operating in a real-world environment. The user profile includes a user name, a user identifier and authentication data. The authentication data is configured to authorize a user device associated with a user to conduct interactions with the entity in the virtual environment. The processor identifies an avatar associated with the user device to initiate an interaction session with the entity in the virtual environment. The processor receives a metaverse identifier associated with the avatar. The processor queries an interaction database to determine whether the metaverse identifier is linked to the user identifier of the user profile. In response to determining that the metaverse identifier is linked to the user identifier of the user profile, the processor retrieves a user name associated with the user identifier of the user profile from the interaction database. The processor presents a first greeting notification with the user name to the user device to grant access to the virtual environment for the avatar. The processor queries the interaction database to obtain interaction data associated with the user identifier. The processor determines whether there is a pending task associated with the user identifier based on the interaction data. In response to determining a pending task associated with the user identifier, the processor presents a first interaction notification corresponding to the pending task to the user device.

The present disclosure presents a practical application that may be implemented by the processor of the server to generate notifications to greet and facilitate an avatar to conduct interactions with an entity in a virtual environment. For example, the server may greet the avatar with a user name used in the real-world environment if the metaverse identifier is linked to a user identifier of a user profile. The user profile is registered with the entity in the real-world environment. These processes provide reliable and efficient solutions to greet the avatar with a real-world identity of a user (e.g., a real user name) and grant an authentication to the avatar to access the virtual environment. If the metaverse identifier is not linked to a user identifier of a user profile, the server may communicate with the avatar to obtain the user identifier and establish a link between the metaverse identifier and the user identifier in the database. These processes also provide a practical application to verify and authenticate a metaverse identity with a user identity used in the real-world environment. Further, the server may present interaction notifications to facilitate the avatar to conduct an interaction to complete a pending task. The server may provide one or more interaction options for the avatar to choose to proceed based on historical user interactions in the real-world environment. In this way, the practical application provides a reliable and effective solution to greet and facilitate the avatar to conduct interactions in the virtual environment based on user profile information and historical user interactions in the real-world environment.

These practical applications lead to technical advantage of improving application service security and efficiency to the overall computer system. For example, linking a metaverse identifier to a user identifier in a real-world environment prevents unauthorized and anomalous interactions in a virtual environment. Further, linking the metaverse identifier to the user identifier integrates the user profile information and historical user interactions in the real-world environment into the virtual environment. Thus, the avatar may access and conduct interactions in the virtual environment securely and effectively to ensure that the interactions are compatible with a user identity, user profile information and historical user interactions in the real-world environment. The disclosed system further improves user experience and saves task processing time to conduct interactions in the virtual environment. Thus, the disclosed system improves computer system security, system compatibility, and interaction operation efficiency of the overall computer system.

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Previous technologies fail to provide efficient and reliable solutions to generate notifications to greet and facilitate an avatar to access a virtual environment and conduct interactions. This disclosure presents a system for generating notifications to greet and facilitate the avatar to access the virtual environment and conduct interactions compatible with user profile information and user interactions in a real-world environment by referring to FIGS. 1-3.

System Overview

Figure 1:
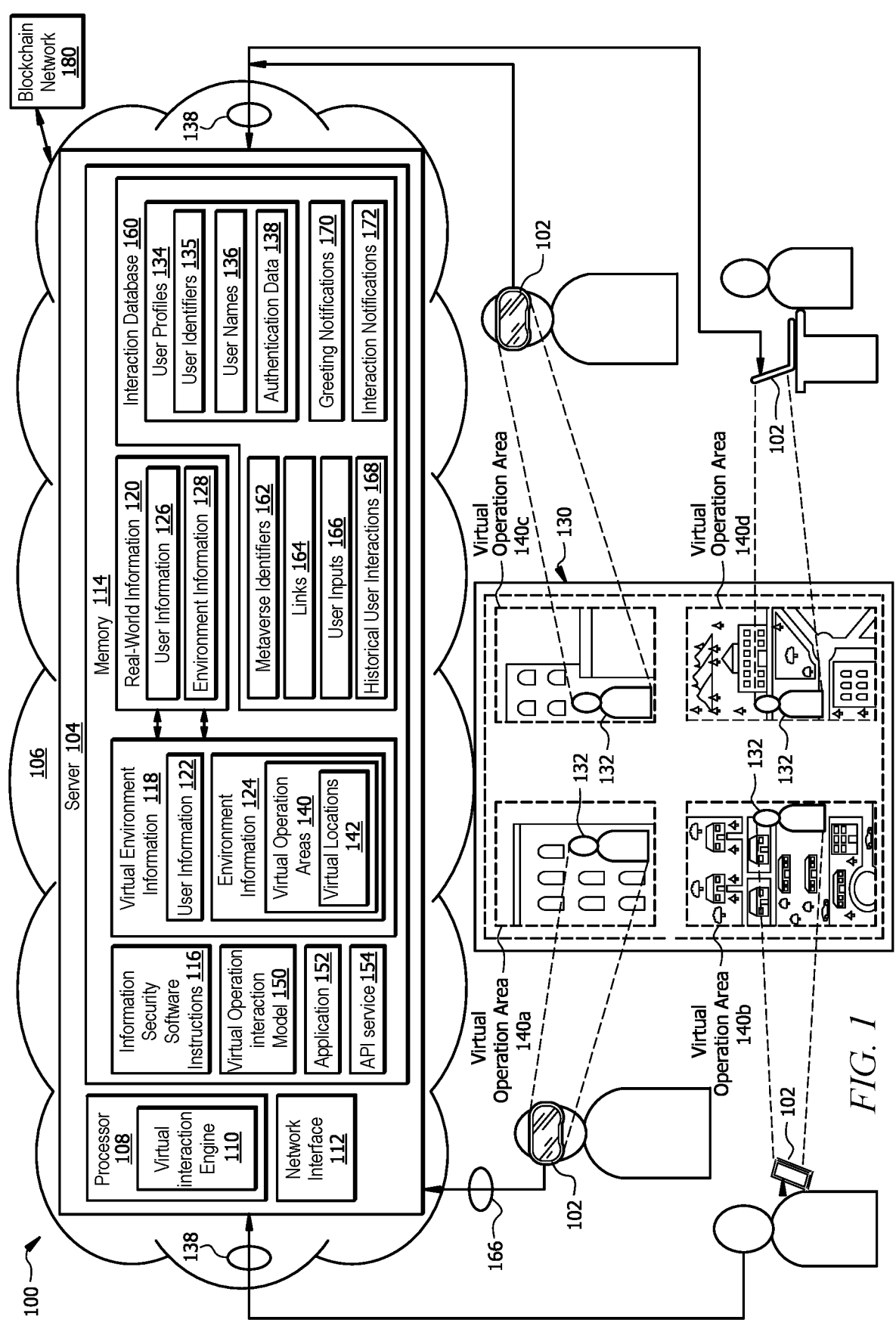
FIG. 1 illustrates an embodiment of a system configured to generate notifications for an avatar in a virtual environment.

FIG. 1 illustrates one embodiment of a system 100 that is configured to generate greeting notifications 170 and interaction notifications 172 to greet and facilitate an avatar 132 to conduct interactions within a virtual environment 130. In one embodiment, system 100 comprises a server 104, one or more user devices 102, a blockchain network 180 and a network 106. The system 100 may be communicatively coupled to the network 106 and may be operable to transmit data between each user device 102, the server 104, and the blockchain network 180 through the network 106. Network 106 enables the communication between components of the system 100. The blockchain network 180 is a public blockchain network which may be referred to a distributed database shared by a plurality of computing devices in the network 106. Server 104 comprises a processor 108 in signal communication with a memory 114. Memory 114 stores information security software instructions 116 that when executed by the processor 108, cause the processor 108 to execute one or more functions described herein.

In some embodiments, the system 100 may be implemented by the server 104 to greet an avatar 132 entering a virtual environment 130 and facilitate the avatar 132 to conduct interactions. The avatar 132 is associated with a user device 102 (e.g., AR/VR headset) operated by a user to conduct interactions with an entity in the virtual environment 130. The server 104 may receive a metaverse identifier 162 of the avatar 132 entering the virtual environment 130. If the server 104 determines that the metaverse identifier 162 is linked to a user identifier 135 of a user profile 134 stored in an interaction database 160, the server 104 may present a greeting notification 170 to greet the avatar 132 with the user name 136 of the user profile 134 and authorize the avatar 132 to access the virtual environment 130. If the metaverse identifier 162 is not linked to the user identifier 135, the server 104 may present a greeting notification 170 to greet the avatar 132 with the metaverse identifier 162. The server 104 may obtain, the user name 136, the user identifier 135 and the authentication data 138 from the user based on user inputs 166. The server 104 may further establish a link 164 between the metaverse identifier 162 and the user identifier 135 of the user profile 134 in the interaction database 160. The server 104 may present interaction notifications 172 with a pending task or one or more interaction options based on historical user interactions 168 for the avatar 132.

System Components

Network

The network 106 may include any interconnecting system capable of transmitting audio, video, signals, data, messages, or any combination of the preceding. The network 106 may include all or a portion of a local area network, a metropolitan area network, a wide area network, an overlay network, a software-defined network a virtual private network, a packet data network (e.g., the Internet), a mobile telephone network (e.g., cellular networks, such as 4G or 5G), a Plain Old Telephone network, a wireless data network (e.g., Wi-Fi, WiGig, WiMax, etc.), a Long Term Evolution network, a Universal Mobile Telecommunications System network, a peer-to-peer network, a Bluetooth network, a Near Field Communication network, a Zigbee network, and/or any other suitable network. The network 106 may be configured to support any suitable type of communication protocol as would be appreciated by one of ordinary skill in the art.

User Devices

A user device 102 is a hardware device that is generally configured to provide hardware and software resources to a user. Examples of a user device 102 include, but are not limited to, a virtual reality (VR) device, an augmented reality (AR) device, a laptop, a computer, a smartphone, a tablet, a smart device, an Internet-of-Things (IoT) device, or any other suitable type of device. The user device 102 may comprise a graphical user interface (e.g., a display), a touchscreen, a touchpad, keys, buttons, a mouse, or any other suitable type of hardware that allows a user to view data and/or to provide inputs into the user device 102.

Each user device 102 is configured to display a two-dimensional (2D) or three-dimensional (3D) representation of a virtual environment 130 to a user. Within the virtual environment 130, each user may be associated with a user device 102 and an avatar 132. An avatar 132 is a graphical representation of the user device 102 associated with the user and the user profile 134 within the virtual environment 130. Examples of the avatars 132 include, but are not limited to, a person, an animal, or an object. In some embodiments, the features and characteristics of the avatar 132 may be customizable and user defined. For example, the size, shape, color, attire, accessories, or any other suitable type of appearance features may be specified by a user. By using the avatar 132, a user or the user device 102 can move within the virtual environment 130 to interact with an entity associated with the server 104 or other avatars 132 and objects within the virtual environment 130.

Figure 2:
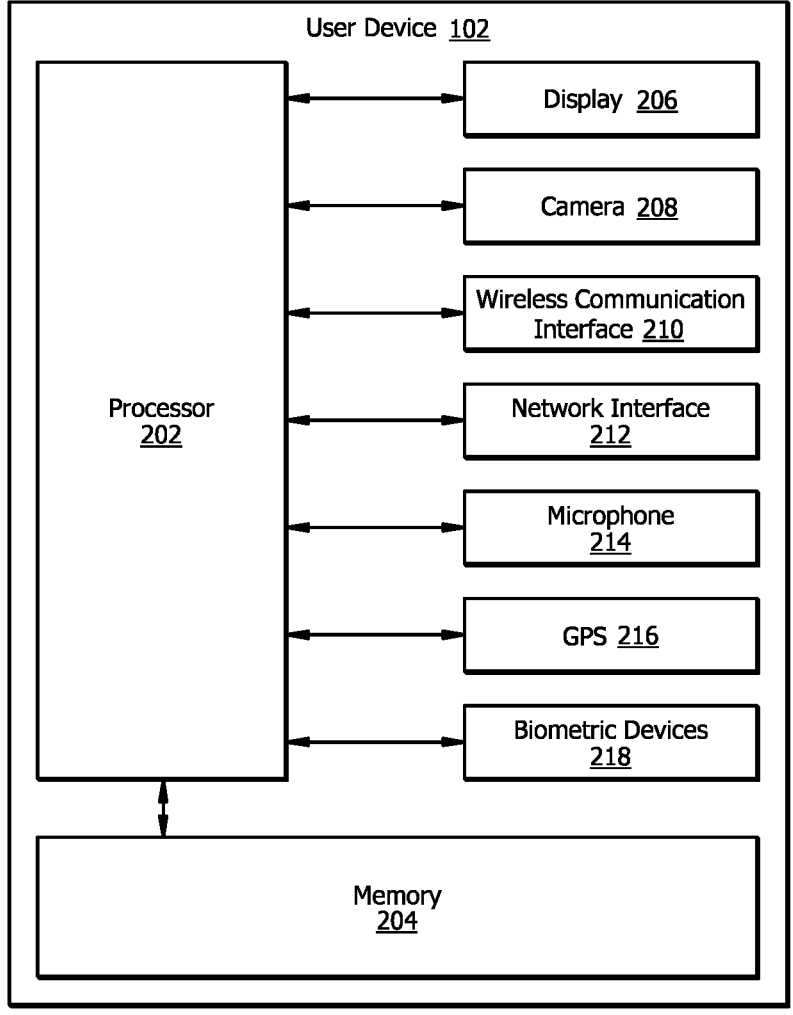
FIG. 2 is a block diagram of an example user device of the system of FIG. 1.

FIG. 2 is a block diagram of an embodiment of the user device 102 used by the system of FIG. 1. The user device 102 may be configured to display the virtual environment 130 (referring to FIG. 1) within a field of view of the user (referring to FIG. 1), capture biometric, sensory, and/or physical information of the user wearing and operating the user device 102, and to facilitate an electronic interaction between the user and the server 104. The user device 102 comprises a processor 202, a memory 204, and a display 206. The processor 202 comprises one or more processors operably coupled to and in signal communication with memory 204, display 206, camera 208, wireless communication interface 210, network interface 212, microphone 214, GPS sensor 216, and biometric devices 218. The one or more processors is any electronic circuitry including, but not limited to, state machines, one or more central processing unit (CPU) chips, logic units, cores (e.g., a multi-core processor), field-programmable gate array (FPGAs), application specific integrated circuits (ASICs), or digital signal processors (DSPs). The processor 202 may be a programmable logic device, a microcontroller, a microprocessor, or any suitable combination of the preceding. The one or more processors are configured to process data and may be implemented in hardware or software. For example, the processor 202 may be 8-bit, 16-bit, 32-bit, 64-bit or of any other suitable architecture. The processor 202 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The one or more processors are configured to implement various instructions. For example, the one or more processors are configured to execute instructions to implement the function disclosed herein, such as some or all of those described with respect to FIGS. 1 and 3. For example, processor 202 may be configured to display virtual objects on display 206, detect user location, identify virtual sub, capture biometric information of a user, via one or more of camera 208, microphone 214, and/or biometric devices 218, and communicate via wireless communication interface 210 with server 104 and/or other user devices 102.

Figure 3:
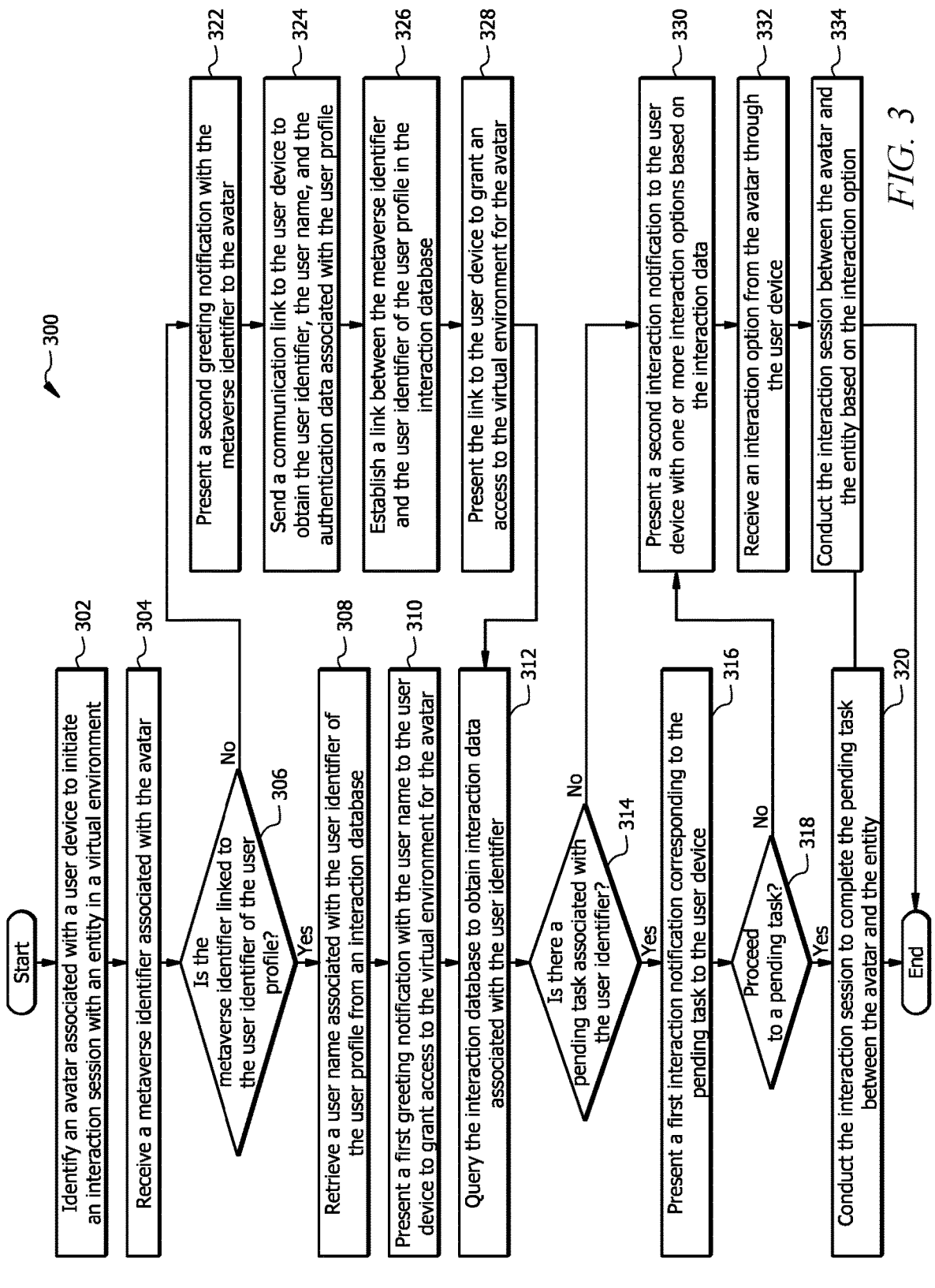
FIG. 3 illustrates an example operational flow of a method for generating the notifications for the avatar in the virtual environment.

Memory 204 is operable to store any of the information described with respect to FIGS. 1 and 3 along with any other data, instructions, logic, rules, or code operable to implement the function(s) described herein when executed by processor 202. The memory 204 comprises one or more disks, tape drives, or solid-state drives, and may be used as an over-flow data storage device, to store programs when such programs are selected for execution, and to store instructions and data that are read during program execution. In some embodiments, the memory 204 may store and/or include a browser or web application for a user device 102 to interact with the entity, such as, for example, to access application services (e.g., application 152) in the virtual environment 130.

Display 206 is configured to present visual information to a user (for example, user in FIG. 1) in an augmented reality environment that overlays virtual or graphical objects onto tangible objects in a real scene in real-time. In other embodiments, the display 206 is configured to present visual information to the user as the virtual environment 130 (referring to FIG. 1) in real-time. In an embodiment, display 206 is a wearable optical display (e.g., glasses or a headset) configured to reflect projected images and enables a user to see through the display 206. For example, display 206 may comprise display units, lens, semi-transparent mirrors embedded in an eye glass structure, a visor structure, or a helmet structure. Examples of display units include, but are not limited to, a cathode ray tube (CRT) display, a liquid crystal display (LCD), a liquid crystal on silicon (LCOS)

display, a light emitting diode (LED) display, an active matrix OLED (AMOLED), an organic LED (OLED) display, a projector display, or any other suitable type of display as would be appreciated by one of ordinary skill in the art upon viewing this disclosure. In another embodiment, display 206 is a graphical display on a user device 102. For example, the graphical display may be the display of a tablet or smart phone configured to display an augmented reality environment with virtual or graphical objects overlaid onto tangible objects in a real scene in real-time environment and/or virtual environment 130.

Camera 208 is configured to capture images of a wearer of the user device 102. Camera 208 may be configured to capture images continuously, at predetermined intervals, or on-demand. For example, camera 208 may be configured to receive a command from the user to capture an image. In another example, camera 208 is configured to continuously capture images to form a video stream. Camera 208 is communicably coupled to processor 202.

Wireless communication interface 210 is configured to facilitate processor 202 in communicating with other devices. Wireless communication interface 210 is configured to employ any suitable communication protocol.

Network interface 212 may be configured to use any suitable type of communication protocol and enable wired and/or wireless communications. as would be appreciated by one of ordinary skill in the art.

Microphone 214 is configured to capture audio signals (e.g., voice signals or commands) from a user. Microphone 214 is communicably coupled to processor 202.

GPS sensor 216 is configured to capture and to provide geographical location information. For example, GPS sensor 216 is configured to provide a geographic location of a user device 102 associated with a user. GPS sensor 216 may be configured to provide the geographic location information as a relative geographic location or an absolute geographic location. GPS sensor 216 may provide the geographic location information using geographic coordinates (i.e., longitude and latitude) or any other suitable coordinate system. GPS sensor 216 is communicably coupled to processor 202.

Examples of biometric devices 218 may include, but are not limited to, retina scanners and fingerprint scanners. Biometric device 218 is communicably coupled to processor 202. Biometric devices 218 are configured to capture information about a person's physical characteristics and to output a biometric signal based on captured information.

Server

Referring back to FIG. 1, the server 104 is a hardware device that is generally configured to provide services and software and/or hardware resources to user devices 102. The server 104 is generally a server, or any other device configured to process data and communicate with user devices 102 via the network 106. The server 104 is generally configured to oversee the operations of a virtual interaction engine 110, as described further below in conjunction with the operational flows of a method 300 described in FIG. 3. In particular embodiments, the server 104 may be implemented in the cloud or may be organized in either a centralized or distributed manner.

Processor

The processor 108 is a hardware device that comprises one or more processors operably coupled to the memory 114. The processor 108 is any electronic circuitry including, but not limited to, state machines, one or more central processing unit (CPU) chips, logic units, cores (e.g., a multi-core processor), field-programmable gate array (FPGAs), application-specific integrated circuits (ASICs), or digital signal processors (DSPs). The processor 108 may be a programmable logic device, a microcontroller, a microprocessor, or any suitable combination of the preceding. The processor 108 is communicatively coupled to and in signal communication with the memory 114 and the network interface 112. The one or more processors are configured to process data and may be implemented in hardware or software. For example, the processor 108 may be 8-bit, 16-bit, 32-bit, 64-bit, or of any other suitable architecture. The processor 108 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The one or more processors are configured to implement various instructions. The processor 108 may be a special-purpose computer designed to implement the functions disclosed herein.

In an embodiment, the virtual interaction engine 110 is implemented using logic units, FPGAs, ASICs, DSPs, or any other suitable hardware. The virtual interaction engine 110 may be configured to perform operations of the method 300 as described in FIG. 3. For example, the virtual interaction engine 110 may be configured to generate greetings notifications 170 and interaction notifications 172 to greet and facilitate an avatar 132 to conduct interactions in the virtual environment 130. As another example, the virtual interaction engine 110 may be configured to facilitate the avatar 132 to conduct interactions within a virtual environment 130 using real-world resources, such as user profile information and historical user interactions 168.

The memory 114 stores any of the information described above with respect to FIGS. 1-3 along with any other data, instructions, logic, rules, or code operable to implement the function(s) described herein when executed by the processor 108. The memory 114 comprises one or more disks, tape drives, or solid-state drives, and may be used as an over-flow data storage device, to store programs when such programs are selected for execution, and to store instructions and data that are read during program execution. The memory 114 may be volatile or non-volatile and may comprise a read-only memory (ROM), random-access memory (RAM), ternary content-addressable memory (TCAM), dynamic random-access memory (DRAM), and static random-access memory (SRAM).

The memory 114 is operable to store information security software instructions 116 which may comprise any suitable set of instructions, logic, rules, or code operable to execute the virtual interaction engine 110. In an example operation, the memory 114 may store a virtual operation interaction model 150, an application 152, an application programming interface (API) service 154, and other program models which executed by the processor 108 to implement operational flows of the system of FIG. 1. The application 152 may be a metaverse application associated with an entity that provides application services to an avatar 132 associated with a user and a user device 102 in a virtual environment 130.

Database 160 (e.g., interaction database 160) may be a remote database, a cloud database, or an on-site internal database. Database 160 may be coupled to or in communication with and accessed by the server 104 via the network 106. As illustrated in FIG. 1, the database 160 is an internal database and stores information including user profiles 134, metaverse identifiers 162, links 164, user inputs 166, historical user interactions 168, greeting notifications 170, and interaction notifications 172.

A user profile 134 may include a user identifier 135, a user name 136, and authentication data 138. The use may register a user profile 134 with the entity operating in a real-world environment. The user identifier 135 represents a user identity and is associated with the user name 136, authentication data 138, and historical user interactions which are stored in the interaction databased 160. The user name 136 may be a real name of the user associated with the entity in the real-world environment. In some embodiments, Authentication data 138 may include user credentials and be configured to provide authentication for a user with a user device 102 to interact with the entity associated with different systems or platforms. The server 104 may verify user authentication based on authentication data 138 to grant an authentication to the avatar 132 to access a plurality of virtual operation areas 140 to interact with the entity in a virtual environment 130. A user profile 134 further includes a physical address, email address, phone number, and any other data, such as documents, files, media items, etc. The plurality of user profiles 134 may be stored by the processor 108 in the memory 114.

Each metaverse identifier 162 represents an avatar 132 associated with a user or a user device 102 in the virtual environment 130. The links 164 may include a plurality of identity links and each link 164 may represent a connection between a user identifier 135 of the user profile 134 and a metaverse identifier 162 of the avatar 132. The historical user interactions 168 may include any pending tasks, such as open service tickets, recent interactions or anomalous request records. For example, the recent interactions may include call center interactions and online interactions. The online interactions may occur between the user and the entity in the real-world environment and/or the virtual environment 130.

The virtual environment information 118 comprises user information 122 and environment information 124. The user information 122 generally comprises information that is associated with any user profiles 134 associated with user accounts that can be used within a virtual environment 130. The environment information 124 includes data of virtual operation areas 140*a*-140*d* and corresponding virtual locations 142. For example, user information 122 may comprise user profile information, online account information, digital assets information, or any other suitable type of information that is associated with a user within a virtual environment 130. The environment information 124 generally comprises information about the appearance of a virtual environment 130. For example, the environment information 124 may comprise information associated with objects, landmarks, buildings, structures, avatars 132, virtual operation areas 140, or any other suitable type of element that is present within a virtual environment 130. In some embodiments, the environment information 124 may be used to create a representation of a virtual environment 130 for users. In this case, a virtual environment 130 may be implemented using any suitable type of software framework or engine.

Examples of a virtual environment 130 include, but are not limited to, a graphical or virtual representation of a metaverse, a map, a city, a building interior, a landscape, a fictional location, an alternate reality, or any other suitable type of location or environment. A virtual environment 130 may be configured to use realistic or non-realistic physics for the motion of objects within the virtual environment 130. For example, some virtual environment 130 may be configured to use gravity whereas other virtual environment 130 may not be configured to use gravity.

The real-world information 120 comprises user information 126 and environment information 128. The user information 126 generally comprises information that is associated with user profiles 134 and user accounts that can be used within the real world. For example, user information 126 may comprise user profile information, account information, or any other suitable type of information that is associated with a user within a real-world environment. The environment information 128 generally comprises information that is associated with an entity within the real world that the user is a member of or is associated with. For example, the environment information 128 may comprise physical addresses, GPS based locations, phone numbers, email addresses, contact names, or any other suitable type of information that is associated with an entity. Since the server 104 has access to both the virtual environment information 118 and the real-world information 120, the server 104 may link the virtual environment information 118 and the real-world information 120 together for a user such that changes to the virtual environment information 118 affect or propagate to the real-world information 120 and vice-versa. The server 104 may be configured to store one or more maps that translate or convert different types of interactions between the real world information 120 and the virtual environment 130 and vice-versa.

The server 104 may generate a virtual environment 130 based on the virtual environment information 118 and the real-world information 120. In some embodiments, the virtual environment 130 comprises a plurality of associated virtual operation areas 140. Each virtual operation area 140 may represent a metaverse branch of the entity. In one embodiment, the virtual operation areas 140 may be configured and executed by the processor 108 to provide one or more services provided by an entity at different physical locations in the real-world environment. The server 104 may be configured to store one or more maps executed by the processor 108 that translate or convert different types of interactions occurred in the virtual operation areas 140 between the real-world information 120 and the virtual environment 130 and vice-versa.

Within the virtual environment 130, an avatar 132 is generated by the processor 108 as a graphical representation of a user device 102 within the virtual environment 130. The avatar 132 includes a plurality of features and characteristics which are processed by the processor 108 to present the avatar 132 as the graphical representation of a user device 102 in the virtual environment 130. For example, the server 104 may receive a signal indicating a physical location of the user device 102 and/or detect the user device 102 in the real-world environment. The server 104 may store the received signal in the memory 114. The server 104 may determine a virtual location 142 of the avatar 132 associated with the user device 102 in the virtual environment 130 based on the physical location of the user device 102. The server 104 may obtain the environment information 124 and environment information 128 associated with the virtual location 142 and the physical location of the user device 102. The server 104 may generate and present an avatar 132 in the virtual environment 130 based on the obtained environment information 124 and environment information 128. By using the user device 102, the avatar 132 can move or maneuver and interact with entities, other avatars, and objects within the virtual environment 130.

Network interface 112 is a hardware device that is configured to enable wired and/or wireless communications.

The network interface 112 is configured to communicate data between user devices 102 and other devices, systems, or domains. For example, the network interface 112 may comprise an NFC interface, a Bluetooth interface, a Zigbee interface, a Z-wave interface, a radio-frequency identification (RFID) interface, a WIFI interface, a LAN interface, a WAN interface, a PAN interface, a modem, a switch, or a router. The processor 108 is configured to send and receive data using the network interface 112. The network interface 112 may be configured to use any suitable type of communication protocol as would be appreciated by one of ordinary skill in the art.

Virtual Interaction Engine

Virtual interaction engine 110 may include, but is not limited to, one or more separate and independent software and/or hardware components of a server 104. In some embodiments, the virtual interaction engine 110 may be implemented by the processor 108 by executing the information security software instructions 116 to create a virtual environment 130 with a plurality of virtual operation areas 140a-140d. The virtual interaction engine 110 may be implemented by the processor 108 by executing the application 152 to detect a user device 102, generate an avatar 132 associated with the user device 102, and receive a metaverse identifier 162 for the avatar 132 in the virtual environment 130. The virtual interaction engine 110 may be implemented by the processor 108 to execute a virtual operation interaction model 150 to identify or establish a link between the metaverse identifier 162 of the avatar 132 and a user identifier 135 of a user profile 134 in the real-world environment. The virtual operation interaction model 150 may be executed by the processor 108 to generate a greeting notification 170 to greet the avatar 132 with a user name 136 or the metaverse identifier 162. The virtual operation interaction model 150 may be executed by the processor 108 to generate interaction notifications 172 to provide a pending task or one or more interaction options to facilitate the avatar 132 to interact with the entity in the virtual environment 130. The operation of the disclosed system 100 is described below.

Linking a Metaverse Identifier to a User Identifier to Greet an Avatar in a Virtual Environment This process may be implemented by the server 104 to identify or establish a link between a metaverse identifier 162 of the avatar 132 and a user identifier 135 of a user profile 134. Based on the metaverse identifier 162 of the avatar 132, the server 104 may query an interaction database 160 to determine whether the metaverse identifier 162 is linked or mapped to a user identifier 135 of the user profile 134. The user profile 134 is registered with the entity in real-world environment. In one embodiment, the server 104 may search the metaverse identifier 162 in the interaction database 160 to determine whether the metaverse identifier 162 is linked or mapped to a user identifier 135 of the user profile 134.

In response to determining that the metaverse identifier 162 is linked or mapped to a user identifier 135 in the interaction database 160, the server 104 may retrieve a user name 136 associated with the user profile 134 from the interaction database 160. The user name 136 may represent a real name or physical name of a user associated with the entity in the real-world environment. The server 104 may generate a greeting notification 170 to greet the avatar 132 with the user name 136 and grant an authentication to the avatar 132 to access the virtual environment 130. The greeting notification 170 may comprise one or more of textual data, audio data, or video data. For example, the server 104 may generate or present a greeting notification 170 to greet the avatar 132, such as "Hello Joe!"

In response to determining that the metaverse identifier 162 is not linked or mapped to a user identifier 135 in the interaction database 160, the server 104 may generate a greeting notification 170 to greet the avatar 132 with the metaverse identifier 162. The server 104 may further communicate with the avatar 132 to obtain user profile information including the user identifier 135, the user name 136, and the authentication data 138. For example, the server 104 may send a push notification message to the user device 102 with the communication link via the network 106. The server 104 may receive user inputs 166 through the communication link with the user profile information including a user name 136, user identifier 136 and the authentication data 138. The server 104 may receive audio user inputs 166 with the user profile information from the avatar 132 or user device 102. The server 104 may present a graphical user interface on the display 206 of the user device 102 through the application 152 to receive user inputs 166 of the user profile information.

The server 104 may establish a link 164 between the metaverse identifier 162 and the user identifier 135 in the interaction database 160. The link 164 between the metaverse identifier 162 and the user identifier 135 may represent an authentication to authorize the avatar 132 to access the virtual environment 130 and interact with the entity.

In one embodiment, the server 104 may access a public blockchain network 180 via the network 106 to obtain a user name 136 or a user identifier 135 which matches the metaverse identifier 162. The blockchain network 180 may be configured to distribute user interaction information associated with the avatar 132 and the user. The user interaction information may include information associated with the avatar 132, user profile 134, interaction data between the user and the entity, user inputs 166, the entity, and/or any other information. The server 104 may use a background application programming interface (API) service 154 via the network 106 to access the public blockchain network 180. The server 104 may use the metaverse identifier 162 to query an underlying blockchain to obtain a user name 136 or a user identifier 135 which matches the metaverse identifier 162. The server 104 may establish a link 164 between the metaverse identifier 162 and the user identifier 135 of the user profile 134 in the interaction database 160.

Generating Notifications to Facilitate an Avatar to Conduct Interactions in a Virtual Environment This process may be implemented by the server 104 to process information of the user profile 134 and historical user interactions 168 to generate interaction notifications 172 to facilitate the avatar 132 to conduct interactions in the virtual environment 130. In one embodiment, based on the link 164 between the metaverse identifier 162 and the user identifier 135, the server 104 may query the interaction database 160 to obtain historical user interactions 168 associated with the user identifier 135. In some embodiments, the server 104 may project a purpose of visit for the avatar 132 based on the historical user interactions 168 associated with the user identifier 135. The purpose of visit may be one or more pending tasks or pending interactions. The server 104 may identify a purpose of visit of the avatar 132 by determining a pending task associated with the user identifier 135 and other interaction options based on the historical user interactions 168.

In some embodiments, the server 104 may generate an interaction notification 172 for the avatar 132 to choose or confirm the identified purpose of visit. The interaction notification 172 may comprise one or more of textual data, audio data, or video data. For example, the server 104 may present the interaction notification 172 with a pending task for the avatar 132 to choose to proceed with the corresponding interaction with the entity. In another example, the server 104 may present one or more interaction options to the display 206 of the user device 102 for the user to select to facilitate the avatar 132 to interact with the entity.

Example Operational Flow for Generating Interaction Notifications for an Avatar

FIG. 3 provides an example operational flow of a method 300 of generating notifications for an avatar 132 to conduct interactions in the virtual environment 130. Modifications, additions, or omissions may be made to method 300. Method 300 may include more, fewer, or other operations. For example, operations may be performed by the server 104 in parallel or in any suitable order. One or more operations of the method 300 may be implemented, at least in part, in the form of the information security software instructions 116 of FIG. 1, stored on non-transitory, tangible, machine-readable media (e.g., memory 114 of FIG. 1) that when executed by one or more processors (e.g., processor 108 of FIG. 1) may cause the one or more processors to perform operations 302-334.

The method 300 begins at operation 302 where the server 104 identifies an avatar 132 associated with the user device 102 and a user to initiate an interaction session with an entity in the virtual environment 130. The server 104 may identify an avatar 132 associated with a user and a user device 102 entering the virtual environment 130. For example, the server 104 may identify the avatar 132 entering a virtual operation area 140, such as a metaverse branch of the entity in the virtual environment 130.

At operation 304, the server 104 receives a metaverse identifier 162 associated with the avatar 132 in response to identifying the avatar 132. For example, the server 104 may assign a metaverse identifier 162 for the avatar in the virtual environment 130. In another example, the user may access the application 152 through a browser application executed on the user device 102 to register a metaverse identifier 162 for the application services with the entity in the virtual environment 130.

At operation 306, the server 104 queries an interaction database 160 with the metaverse identifier 162 to determine whether the metaverse identifier 162 is linked to the user identifier 135 of the user profile 134.

At operation 308, in response to determining that the metaverse identifier 162 is linked to the user identifier of the user profile 134, the server 104 may retrieve a user name 136 associated with the user identifier 135 of the user profile 134 from the interaction database 160.

At operation 310, the server 104 presents a first greeting notification 170 with the user name 136 to the user device 102 to grant access to the virtual environment 130 for the avatar 132. For example, the server 104 may present the first greeting notification 170 with the user name 136 to the user device 102 to greet the avatar 132. The user name may be a user's real name or physical name that the user registers with the entity to conduct interactions in the real-world environment. For example, the server 104 may generate an audio greeting notification 170 to greet the avatar 132, such as "Hello Joe!" The server 104 may present the greeting notification 170 as textual data or video data on a display 206 of the user device 102.

At operation 312, the server 104 queries the interaction database 160 to obtain interaction data associated with the user identifier 135. The interaction data may be historical user interactions 168 associated with the user identifier 135. The historical user interactions 168 may include pending tasks, pending interactions, open service tickets, recent interactions, anomalous request records, or other application services provided by the entity.

At operation 314, the server 104 determines whether there is a pending task associated with the user identifier 135 based on the interaction data. The interaction data includes historical user interactions 168 associated with the user identifier 135. The pending task may represent an uncompleted interaction or task required by the entity to complete.

At operation 316, the server 104 presents a first interaction notification 172 corresponding to the pending task on a display 206 of the user device 102 in response to determining the pending task associated with the user identifier 135.

At operation 318, the server 104 requests the avatar 132 to determine whether to proceed with the pending task based on the first interaction notification 172. The interaction notification 172 may include the user name 136 and the pending task information. For example, the server 104 may generate an audio interaction notification 172, such as "Hi Joe, you have an uncompleted interaction. Do you want to proceed with it?" The server 104 may present the interaction notification 172 with text data with a selectable user interface object on the display 206 of the user device 102.

At operation 320, the server 104 may receive a response from the avatar 132 to proceed with the pending task. For example, the server 104 may receive a user selection of the pending task through the display 206 of the user device 102 to proceed with the pending task. The server 104 may receive an audio confirmation to proceed with the pending task from the avatar 132 through the user device 102. The server 104 may conduct the interaction session to complete the pending task between the avatar 132 and the entity in the virtual environment 130.

Returning to operation 306, the server 104 may proceed to operation 322 in response to determining that the metaverse identifier 162 is not linked to the user identifier 135 of the user profile 134. At operation 322, the server 104 may present a second greeting notification 170 with the metaverse identifier 162 to the user device 102.

At operation 324, the server 104 may communicate with the avatar 132 to obtain the user name 136, the user identifier 135 and the authentication data 138 associated with the user profile 134 to access the interaction database 160. The server 104 may receive the user profile information based on user inputs 166 from the avatar 132 or the user device 102. In some embodiments, the server 104 may request the avatar 132 to confirm whether to link the metaverse identifier 162 to the user identifier 135. The server 104 may receive a confirmation from the avatar 132 to link the metaverse identifier 162 to the user identifier 135.

At operation 326, the server 104 establishes a link 164 between the metaverse identifier 162 and the user identifier 135 of the user profile 134 in the interaction database 160 based on the confirmation.

At operation 328, the server 104 presents the link 164 to the user device 102 to grant access to the virtual environment 130 for the avatar 132. The server 104 may continue to proceed to the operation 312 as described above.

Returning to operation 314, the server 104 may proceed to operation 330 in response to determining that there is no pending task associated with the user identifier 135. Alternatively, returning to operation 318, the server 104 may proceed to operation 330 in response to determining that the avatar 132 does not proceed with the pending task. At operation 330, the server 104 may present a second interaction notification 172 to the avatar 132 and the user device 102 with one or more interaction options based on the interaction data, such as historical user interactions 168 associated with the user identifier 135.

At operation 332, the server 104 may receive an interaction option selected by the avatar 132 through the user device 102.

At operation 334, the server 104 may conduct the corresponding interaction session between the avatar 132 and the entity in the virtual environment 130 based on the interaction option selected by the avatar 132 or the user through the user device 102.

In some embodiments, the server 104 may detect the avatar 132 entering different virtual operation areas 140 or branches which may be configured to provide different services to the avatar 132. The server 104 may generate corresponding notifications to facilitate the avatar 132 regarding the particular services associated with the corresponding virtual operation areas 140.

In some embodiments, information security software instructions 116 associated with the operational flows of the method 300 and other described processes may be deployed into a practical application executed by the server 104 to generate greeting notifications 170 and interaction notifications 172 to greet and facilitate an avatar 132 to conduct interactions with the entity in the virtual environment 130. The practical application may be implemented by the processor 108 to present a greeting notification 170 to greet the avatar 132 with a user name 136 or a metaverse identifier 162. The server may verify a user identity by identifying or establishing a link between a user identifier 135 and the metaverse identifier 162 associated with the avatar 132. The link between the user identifier 135 and the metaverse identifier 162 may represent an integration of user profile information and historical user interactions 168 into the virtual environment 130. Based on the identified or established link 164, the practical application may be implemented by the processor 108 to project a pending task or provide one or more interaction options to facilitate the avatar 132 to conduct the interaction session with the entity in the virtual environment 130. Thus, the avatar 132 may access and conduct interactions securely and effectively to ensure that the interactions occurred in the virtual environment 130 are compatible with user profile information and historical user interactions 168 in the real-world environment. The practical application improves interaction process and efficiency and user experience in the real-world environment.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A system comprising:
   a memory operable to store:
      a user profile registered with an entity operating in a real-world environment, the user profile comprising a user name, a user identifier and authentication data configured to authorize a user device associated with a user to conduct interactions with the entity in a virtual environment; and
   a processor operably coupled to the memory, the processor configured to:
      receive a physical location information of the user device associated with the user in the real-world environment;
      store the physical location information in the memory;
      determine a virtual location of an avatar associated with the user device in the virtual environment based on the physical location information stored in the memory;
      obtain a first environment information associated with the virtual location and obtain a second environment information associated with the physical location;
      generate the virtual environment based on the first environment information and the second environment information, wherein the first environment information and the second environment information are linked together such that changes to the first environment information are propagated to the second environment information, and wherein the avatar initiates an interaction session with the entity in the virtual environment;
      electronically receive a metaverse identifier associated with the avatar;
      query an interaction database to electronically determine a link between the metaverse identifier and the user identifier of the user profile;
      in response to determining that the metaverse identifier is not linked to the user identifier of the user profile, access a blockchain network via an application programming interface (API);
      query, via the API, an underlying blockchain of the blockchain network to obtain a user name that matches the metaverse identifier, wherein the user name is utilized by the user to conduct interactions with the entity in the real-world environment;
      in response to querying the underlying blockchain to obtain the user name that matches the metaverse identifier, present a first greeting notification with the user name to the user device to grant access to a plurality of virtual operation areas in the virtual environment for the avatar, wherein each of the virtual operation areas provides one or more services provided by the entity at different physical locations in the real-world environment;
      query the interaction database to obtain interaction data associated with the user name, wherein the interaction data comprises historical user interactions performed in the real-world environment between the user and the entity;
      determine whether there is a pending task associated with the user name based on historical user interactions performed in the real-world environment between the user and the entity;
      in response to determining a pending task associated with the user identifier, generate and present a first interaction notification corresponding to the pending task to the user device;
      receive a response to proceed with completing the pending task in the virtual environment based on the avatar interacting with the first interaction notification; and
      generate an interaction session to facilitate the avatar associated with the user device to interact with the entity to complete the pending task in the virtual environment.

2. The system of claim 1, wherein the processor is further configured to, in response to determining that the metaverse identifier is not linked to the user identifier of the user profile:
   present a second greeting notification with the metaverse identifier to the user device; and
   send a communication link to the user device to obtain the user name and the authentication data associated with the user profile for an authentication to access the interaction database.

3. The system of claim 2, wherein the processor is further configured to:
   access the interaction database to obtain the user identifier of the user profile; and
   receive a confirmation from the avatar to link the metaverse identifier to the user name and the authentication data of the user profile.

4. The system of claim 3, wherein the processor is further configured to:
   establish, based on the confirmation, the link between the metaverse identifier and the user identifier of the user profile in the interaction database; and
   present the link to the user device to grant access to the virtual environment for the avatar.

5. The system of claim 1, wherein the processor is further configured to:
   request, based on the first interaction notification, the avatar to determine whether to proceed with the pending task; and
   in response to proceeding with the pending task, conduct the interaction session to complete the pending task between the avatar and the entity in the virtual environment.

6. The system of claim 1, wherein the processor is further configured to, in response to not proceeding with the pending task:
   present a second interaction notification to the user device with one or more interaction options based on the interaction data;
   receive an interaction option selected by the avatar through the user device; and
   conduct the corresponding interaction session between the avatar and the entity in the virtual environment based on the interaction option.

7. The system of claim 1, wherein the processor is further configured to, identify the avatar associated with the user device based on the avatar entering one of the virtual operation areas in the virtual environment.

8. A method comprising:

receiving a physical location information of a user device associated with a user in a real-world environment;

storing the physical location information in a memory;

determining a virtual location of an avatar associated with the user device in a virtual environment based on the physical location information stored in the memory;

obtaining a first environment information associated with the virtual location and obtaining a second environment information associated with the physical location;

generating the virtual environment based on the first environment information and the second environment information, wherein the first environment information and the second environment information are linked together such that changes to the first environment information are propagated to the second environment information, and wherein the avatar initiates an interaction session with an entity in the virtual environment;

electronically receiving a metaverse identifier associated with the avatar;

querying an interaction database to electronically determine a link between the metaverse identifier and a user identifier of a user profile;

in response to determining that the metaverse identifier is not linked to the user identifier of the user profile, access a blockchain network via an application programming interface (API);

querying, via the API, an underlying blockchain of the blockchain network to obtain a user name that matches the metaverse identifier, wherein the user name is utilized by the user to conduct interactions with the entity in the real-world environment;

in response to querying the underlying blockchain to obtain the user name that matches the metaverse identifier, presenting a first greeting notification with the user name to the user device to grant access to a plurality of virtual operation areas in the virtual environment for the avatar, wherein each of the virtual operation areas provides one or more services provided by the entity at different physical locations in the real-world environment;

querying the interaction database to obtain interaction data associated with the user name, wherein the interaction data comprises historical user interactions performed in the real-world environment between the user and the entity;

determining whether there is a pending task associated with the user user name based on historical user interactions performed in the real-world environment between the user and the entity;

in response to determining a pending task associated with the user identifier, generating and presenting a first interaction notification corresponding to the pending task to the user device;

receiving a response to proceed with completing the pending task in the virtual environment based on the avatar interacting with the first interaction notification; and generating an interaction session to facilitate the avatar associated with the user device to interact with the entity to complete the pending task in the virtual environment.

9. The method of claim 8, further comprising:

in response to determining that the metaverse identifier is not linked to the user identifier of the user profile, presenting a second greeting notification with the metaverse identifier to the user device; and sending a communication link to the user device to obtain the user identifier, the user name and authentication data associated with the user profile for an authentication to access the interaction database.

10. The method of claim 9, further comprising:

requesting the avatar to confirm whether to link the metaverse identifier to the user identifier of the user profile; and receiving a confirmation from the avatar to link the metaverse identifier to the user identifier of the user profile.

11. The method of claim 10, further comprising:

establishing, based on the confirmation, the link between the metaverse identifier and the user identifier of the user profile in the interaction database; and presenting the link to the user device to grant access to the virtual environment for the avatar.

12. The method of claim 8, further comprising:

requesting, based on the first interaction notification, the avatar to determine whether to proceed with the pending task; and in response to proceeding with the pending task, conducting the interaction session to complete the pending task between the avatar and the entity in the virtual environment.

13. The method of claim 8, further comprising:

in response to not proceeding with the pending task, presenting a second interaction notification to the user device with one or more interaction options based on the interaction data;

receiving an interaction option selected by the avatar through the user device; and conducting the corresponding interaction session between the avatar and the entity in the virtual environment based on the interaction option.

14. The method of claim 8, further comprising:

identifying the avatar associated with the user device based on the avatar entering one of the virtual operation areas in the virtual environment.

15. A non-transitory computer-readable medium that stores instructions, wherein when the instructions are executed by one or more processors, cause the one or more processors to:

receive a physical location information of a user device associated with a user in a real-world environment;

store the physical location information in a memory;

determine a virtual location of an avatar associated with the user device in a virtual environment based on the physical location information stored in the memory;

obtain a first environment information associated with the virtual location and obtain a second environment information associated with the physical location;

generate the virtual environment based on the first environment information and the second environment information, wherein the first environment information and the second environment information are linked together such that changes to the first environment information are propagated to the second environment information, and wherein the avatar initiates an interaction session with an entity in the virtual environment;

electronically receive a metaverse identifier associated with the avatar;

query an interaction database to electronically determine a link between the metaverse identifier and a user identifier of a user profile;

in response to determining that the metaverse identifier is not linked to the user identifier of the user profile, access a blockchain network via an application programming interface (API);

query, via the API, an underlying blockchain of the blockchain network to obtain a user name that matches the metaverse identifier, wherein the user name is utilized by the user to conduct interactions with the entity in the real-world environment;

in response to querying the underlying blockchain to obtain the user name that matches the metaverse identifier, present a first greeting notification with the user name to the user device to grant access to a plurality of virtual operation areas in the virtual environment for the avatar, wherein each of the virtual operation areas provides one or more services provided by the entity at different physical locations in the real-world environment;

query the interaction database to obtain interaction data associated with the user name, wherein the interaction data comprises historical user interactions performed in the real-world environment between the user and the entity;

determine whether there is a pending task associated with the user name based on historical user interactions performed in the real-world environment between the user and the entity;

in response to determining a pending task associated with the user identifier, generate and present a first interaction notification corresponding to the pending task to the user device;

receive a response to proceed with completing the pending task in the virtual environment based on the avatar interacting with the first interaction notification; and generate an interaction session to facilitate the avatar associated with the user device to interact with the entity to complete the pending task in the virtual environment.

16. The non-transitory computer-readable medium of claim 15, wherein the instructions when executed by the processor further cause the processor to:

in response to determining that the metaverse identifier is not linked to the user identifier of the user profile,
   present a second greeting notification with the metaverse identifier to the user device; and send a communication link to the user device to obtain the user identifier, the user name and authentication data associated with the user profile for an authentication to access the interaction database.

17. The non-transitory computer-readable medium of claim 16, wherein the instructions when executed by the processor further cause the processor to:

request the avatar to confirm whether to link the metaverse identifier to the user identifier of the user profile;

receive a confirmation from the avatar to link the metaverse identifier to the user identifier of the user profile;

establish, based on the confirmation, the link between the metaverse identifier and the user identifier of the user profile in the interaction database; and present the link to the user device to grant access to the virtual environment for the avatar.

18. The non-transitory computer-readable medium of claim 15, wherein the instructions when executed by the processor further cause the processor to:

request, based on the first interaction notification, the avatar to determine whether to proceed with the pending task; and in response to proceeding with the pending task, conduct the interaction session to complete the pending task between the avatar and the entity in the virtual environment.

19. The non-transitory computer-readable medium of claim 15, wherein the instructions when executed by the processor further cause the processor to:

in response to not proceeding with the pending task,
   present a second interaction notification to the user device with one or more interaction options based on the interaction data;
   receive an interaction option selected by the avatar through the user device; and
   conduct the corresponding interaction session between the avatar and the entity in the virtual environment based on the interaction option.

20. The non-transitory computer-readable medium of claim 15, wherein the instructions when executed by the processor further cause the processor to:

identify the avatar associated with the user device based on the avatar entering one of the virtual operation areas in the virtual environment.

* * * * *